United States Patent [19]

Del Fabro et al.

[11] Patent Number: 4,573,246
[45] Date of Patent: Mar. 4, 1986

[54] PINCERS FOR THE EXTRACTION OF METAL RODS FROM BUNDLES

[75] Inventors: Marcello Del Fabro, Udine; Giorgio Del Fabro, Montegnacco, both of Italy

[73] Assignee: SAE-Societa Automatismi Elettonici s.r.l., Tavagnacco, Italy

[21] Appl. No.: 536,981

[22] Filed: May 16, 1984

[30] Foreign Application Priority Data

Sep. 27, 1982 [IT] Italy .................. 83451 A/82

[51] Int. Cl.⁴ ............................................. B23P 19/04
[52] U.S. Cl. .................................................... 29/252
[58] Field of Search ............... 269/111, 114, 118, 287; 29/252

[56] References Cited

U.S. PATENT DOCUMENTS 2,580,223 12/1951 Gonda .................................. 29/252
3,024,521 3/1962 Polk .................................... 269/118

Primary Examiner—Robert C. Watson
Attorney, Agent, or Firm—Edmund M. Jaskiewicz

[57] ABSTRACT

Pincers for the extraction of metals rod from bundles comprising a supporting structure (3) with carriages (1 and 2) which enable longitudinal sliding along a rail guide system ("B"). On the supporting structure (3) there is a side flange (5), a lower flat support base (4) which can be extended outwards by a fluidynamic jack (4'), a support cheek (6) which can be moved against the base by means of a fluidynamic jack (6'), a slide clamp (7) opposite the flange (5) which can be moved by a fluidynamic jack (7') within which a bundle of bars is gripped.

3 Claims, 5 Drawing Figures

PINCERS FOR THE EXTRACTION OF METAL RODS FROM BUNDLES

The present invention relates to pincers for the extraction of metal rods from bundles.

The invention is suitable for use in the longitudinal extraction of one or more rods from large bundles of preferably smooth or ribbed rods of the type used in the reinforcement or reinforced-concrete. One specific application of the pincers of the present invention is to be linked to an in-line plant for cutting the rods into pieces using shears positioned along the extraction and feed line, in which one or more of the above-mentioned pincers moves alternately backwards and forwards along the line, at the end of its upstream travel gripping the bundle of rods to be extracted and fed forward, then opening at the end of the its travel downstream to return upstream and re-grip so as to continue the feed or perform another extraction.

At the current state of the art of the only known gripping-pincers have cheeks placed opposite one another and grip the bundle of rods usually lying in the same plane.

The disadvantages of this currently-used known embodiment consist essentially in that when gripping several rods with a fairly high diameter tolerance, what very often occurs, due for instance to deformation of the top end of the rods, is that not all the rods are gripped with the same force and consequently in the subsequent extraction and drawing operation, they slide in relation to each other and move out of alignment. The consequence of this is that the subsequent cutting operation produces pieces of different lengths, thus causing extra work in trimming off the excess and creating machine shop rejections in the form of pieces which are cut too short.

The object of the present invention is to obviate the above-mentioned disadvantages and particularly to produce pincers that are much safer and more efficient in gripping (with the same force) all the rods in a bundle of rods to be gripped by preventing any slipping of one bar relative to another.

The present invention consists in pincers for the extraction of metal rods from bundles, of the type that can be moved in a longitudinal direction to grip one or more rods and extract and/or feed the latter by drawing them along in a longitudinal direction, wherein the pincers have a supporting frame consisting of:
- a flat support base associated, or possibly to be associated with a flange on one side upon which the individual rods making up the bundle rest flat;
- a flat guide cheek opposing the flat support base and movable against the latter so as to be brought close to the row of rods lying on said flat support base without gripping them but sufficiently close to hold them in a position in which they are lying in the same plane;
- a side clamp arranged so that it can move orthogonally in relation to the longitudinal direction of the rods and on the plane in which the rods are lying so as to move from an open position to a position in which said rods are gripped against the said opposing flange, sliding in the free space between said flat support base and said opposing guide cheek so as to firmly grip the rods there enclosed pushing one against the other and against said flange.

The advantage of this invention are essentially that the rods so gripped exert the same gripping force agaist each other, so there is no risk of one being looser than the other.

The invention will now be described in more detail with reference to the accompanying drawings.

As shown in the above-mentioned figures, the pincers are indicated with the letter "A" and the guide rails with the letter "B". More particularly, the guides "B" comprises an upper double "T"-shaped guide and a lower "U"-shaped guide. Two pairs of carriages 1,2 are coupled to the two guides and connected to a supporting frame 3 of the pincers "A" to enable the latter to slide longitudinally along the rails, corresponding to the longitudinal direction of the extraction and movement of a bundle of rods "b". Alternate to and fro movement of the pincers "A" can be achieved with any known equipment. A preferred means comprises a simple fluidynamic double-acting jack, the rod of which is connected by its end to the pincers "A" while the cylinder thereof is supported by a load-bearing structure fixed in relation to the rails "B∞, this device is not illustrated but is easy to envisage and is described in a system for cutting rods covered in a patent application presented in Italy at the same time by the same applicant and entitled: "Method and plant for cutting metal rods into shorter lengths" on which device these pincers can be specifically and suitably used.

Figure 1:
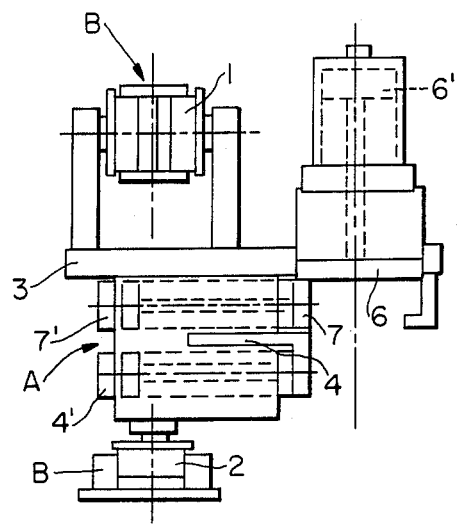
FIG. 1 is a schematic front view of the pincers according to the present invention.
Figure 3:
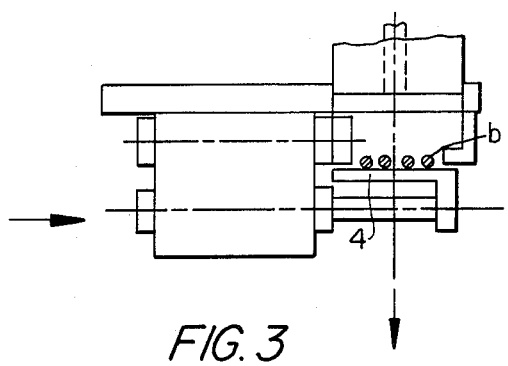
FIGS. 3, 4 and 5 are partial schematic views of the pincers shown in FIG. 1; omitting the carriage that slides on rails and showing the logical order the successive stages of movement involved in gripping a bundle of rods.
Figure 4:
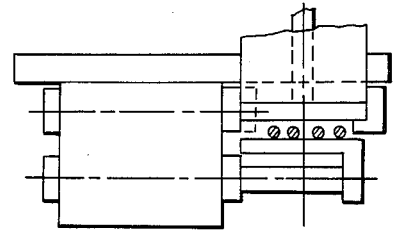
Figure 2:
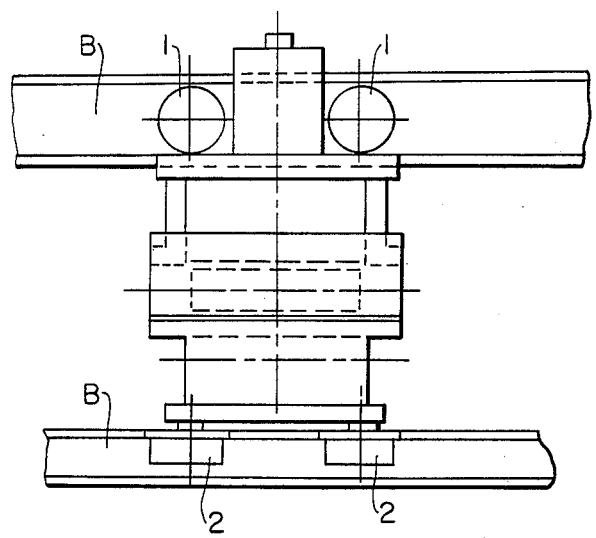
FIG. 2 is a schematic side view of FIG. 1.
Figure 5:
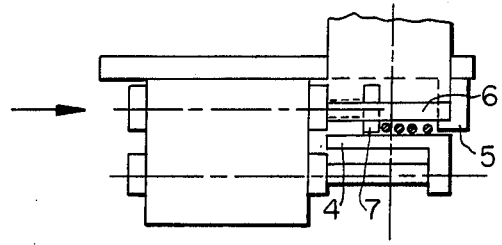

The load-bearing frame 3 of the pincers supports:
- a flat support base 4 which can be moved horizontally from a retracted position to an extended position by means of a fluidynamic jack 4' which is associated with a fixed flange 5 placed opposite to form a right-angled receiving seat on the flat base of which the individual rods making up the bundles "b" rest flat as shown in FIG. 3;
- a flat upper guide cheek 6, placed opposite the flat support base 4, and movable by means of its fluidynamic jack 6', against the flat base 4 so as to move close to the row of rods "b" lying on the flat support base 4 without gripping means but sufficiently near to hold them so that they lie in the same plane;
- a side clamp 7 arranged so that it can be moved orthogonally in relation to the longitudinal direction of the rods and on the plane in which the rods "b" are lying by means of a fluidynamic jack 7', so as to move from an open position (FIGS. 1, 3 and 4) to a position in which the rods "b" are gripped against the opposing flange 5, sliding in the free space between the flat support has 4 and the opposing upper guide cheek 6 so as to firmly grip the rods "b" there enclosed pushing one against the other and against the flange.

We claim:
1. Pincers for the extraction of metal rods from bundles, of the type that can be moved in a longitudinal direction to grip one or more rods and extract and/or feed the latter by drawing them along in a longitudinal direction, and comprising a supporting frame having a fixed flange disposed laterally thereof;

a flat support base having one side upon which the individual rods making up the bundle rest flat and movable relative to said supporting frame from a retracted position to an overhanging position adjacent said flange, hydraulic means on said supporting frame, for moving said flat support base between its retracted and overhanging positions;

a flat guide cheek opposing the flat support base and movable against the latter so as to be brought close to the row of rods lying on said flat support base without gripping them but sufficiently close to hold them in a position in which they are lying in the same plane;

a side clamp movable transversely in relation to the longitudinal direction of the rods and in the plane in which the rods are lying so as to move from an open position to a position in which said rods are gripped against the said fixed flange, said side clamp sliding in the free space between said flat support base and said opposite guide cheek so as to firmly grip the rods there enclosed pushing one against the other and against said flange.

2. Pincers according to claim 1 wherein said supporting frame comprises at least one carriage structure which enables sliding movement along a system of rail guides to be effected.

3. Pincers according to claim 1 wherein said support base is movable to an overhanging position by a fluidynamic jack, said support cheek is movable against the base by means of a fluidynamic jack and said side clamp opposite the flange is movable by a fluidynamic jack within which a bundle of rods is gripped.

* * * * *

UNITED STATES PATENT OFFICE
CERTIFICATE OF CORRECTION

PATENT NO. : 4 573 246

DATED : March 4, 1986

INVENTOR(S) : Marcello Del Fabro et al.

It is certified that error appears in the above-identified patent and that said Letters Patent are hereby corrected as shown below:

On the Title Page,

[73]  SAE - Societa Automatismi Elettronici s.r.l.
      Tavagnacco, Italy

Signed and Sealed this

Twenty-eighth Day of October, 1986

[SEAL]

Attest:

DONALD J. QUIGG

Attesting Officer  Commissioner of Patents and Trademarks